(12) United States Patent
Murray et al.

(10) Patent No.: US 9,469,463 B2
(45) Date of Patent: Oct. 18, 2016

(54) AUTOMATED DISPENSER AND METHOD FOR DISPENSING

(71) Applicant: Tastetro Inc., Bragg Creek (CA)

(72) Inventors: James Bruce Murray, Bragg Creek (CA); Carlos Eduardo Salazar, Bragg Creek (CA); Francis James Giunta, Onalaska, WI (US); Kenneth Scott Hanna, Bellingham, WA (US)

(73) Assignee: Tastetro, Inc., Bragg Creek, Alberta (CA)

( * ) Notice: Subject to any disclaimer, the term of this patent is extended or adjusted under 35 U.S.C. 154(b) by 50 days.

(21) Appl. No.: 14/014,213

(22) Filed: Aug. 29, 2013

(65) Prior Publication Data

US 2015/0060481 A1    Mar. 5, 2015

(51) Int. Cl.
*B67D 7/78*    (2010.01)
*B65D 83/06*   (2006.01)
*B65D 85/804*  (2006.01)
(Continued)

(52) U.S. Cl.
CPC .............. *B65D 83/06* (2013.01); *A47G 19/34* (2013.01); *B01F 13/1058* (2013.01); *B01F 13/1061* (2013.01); *B65D 85/8043* (2013.01); *A47J 31/404* (2013.01)

(58) Field of Classification Search
CPC .................... B01F 13/1058; A47G 2019/122; B67D 1/0004; A61M 15/009; A47K 5/1204; A47K 5/1202; B65D 88/66; A01C 7/02; B05B 15/003; B05B 11/3084; G01F 11/18; G01F 11/24
USPC ...... 222/144, 144.5, 196, 23, 132, 135, 226, 222/424.5, 156, 325, 361, 362, 1, 222/129.1–129.4, 133, 460–462, 142.8, 222/547.5, 448.333, 63
See application file for complete search history.

(56) References Cited

U.S. PATENT DOCUMENTS 502,453 A   8/1893  Worthen
607,716 A   7/1898  Stevenson
(Continued)

FOREIGN PATENT DOCUMENTS

CA     2842603    2/2013

OTHER PUBLICATIONS

International Search Report and Written Opinion mailed on Nov. 28, 2014, International Patent Application No. PCT/CA2014/050830 with International Filing Date of Aug. 29, 2014, (12 pages).
(Continued)

*Primary Examiner* — Lien Ngo
(74) *Attorney, Agent, or Firm* — Stephen M. De Klerk

(57) ABSTRACT

An automated dispenser for dispensing spices, condiments, herbs, teas, ground coffees, or powdered beverages, having a plurality of cartridges mounted on a carrier respectively containing the items, having a dispenser with relative movement capable between the dispenser and the cartridges. A look-up table is provided for operation of the dispenser to dispense a particular variety of mixtures and quantities from the cartridges. When a spice blend and associated dispensing program is selected by a user, the dispensing program aligns the dispenser relative to the cartridge carrier and cartridge, to dispense a particular quantity and, in the case of a mix, to subsequently align with other selected cartridges to provide, from the cartridges, the mix of spices, herbs, condiments, powdered beverages or ground coffees. A specialized cartridge for use in the automated dispenser is also disclosed.

38 Claims, 12 Drawing Sheets

(51) Int. Cl.
*A47G 19/34* (2006.01)
*B01F 13/10* (2006.01)
*A47J 31/40* (2006.01)

(56) References Cited

U.S. PATENT DOCUMENTS

| | | | |
|---|---|---|---|
| 618,219 A | 1/1899 | Bell | |
| 2,315,162 A | 3/1943 | Rasmussen | |
| 2,558,522 A * | 6/1951 | Knapp | A47J 31/40 141/105 |
| 2,660,340 A * | 11/1953 | Thompson | 222/136 |
| 2,660,351 A * | 11/1953 | Thompson | 141/88 |
| 4,168,019 A | 9/1979 | Hausam | |
| 4,391,308 A | 7/1983 | Steiner | |
| 4,776,489 A | 10/1988 | Tarlow et al. | |
| 5,078,302 A | 1/1992 | Hellenberg | |
| 5,119,973 A * | 6/1992 | Miller et al. | 222/144 |
| 5,421,491 A * | 6/1995 | Tuvim | A47J 31/404 222/336 |
| 5,975,366 A * | 11/1999 | Ridgley | A47J 47/01 222/132 |
| 6,145,705 A | 11/2000 | Wallace et al. | |
| 6,412,658 B1 * | 7/2002 | Bartholomew et al. | 222/1 |
| 6,748,986 B2 * | 6/2004 | Chamba | A47F 1/02 141/18 |
| 7,311,223 B2 | 12/2007 | Post | |
| 7,798,376 B2 * | 9/2010 | Kirschner | G01F 11/18 222/181.1 |
| 7,980,426 B2 * | 7/2011 | Vollmann | A61C 5/068 222/145.1 |
| 8,177,095 B1 | 5/2012 | Renyer et al. | |
| 8,191,738 B2 * | 6/2012 | Esteve | A47F 1/035 222/181.1 |
| 8,342,366 B2 | 1/2013 | Renyer et al. | |
| 8,348,103 B1 | 1/2013 | Renyer et al. | |
| 9,073,026 B2 | 7/2015 | Engels et al. | |
| 2003/0057234 A1 * | 3/2003 | Perez Vales | 222/144.5 |
| 2004/0129740 A1 | 7/2004 | Barker, III et al. | |
| 2005/0087545 A1 * | 4/2005 | Petrus Engels et al. | 222/1 |
| 2005/0247730 A1 | 11/2005 | Post | |
| 2006/0191956 A1 * | 8/2006 | Mink et al. | 222/144 |
| 2007/0084520 A1 | 4/2007 | Driessen et al. | |
| 2011/0290823 A1 * | 12/2011 | Miller | 222/132 |
| 2013/0062366 A1 | 3/2013 | Tansey | |

OTHER PUBLICATIONS

Office Action dated Feb. 2, 2016, Canadian Patent Application No. 2,825,721, (3 pages).

Non Final Office Action dated Jun. 14, 2016, U.S. Appl. No. 14/473,864, filed Aug. 29, 2014, (22 pages).

* cited by examiner

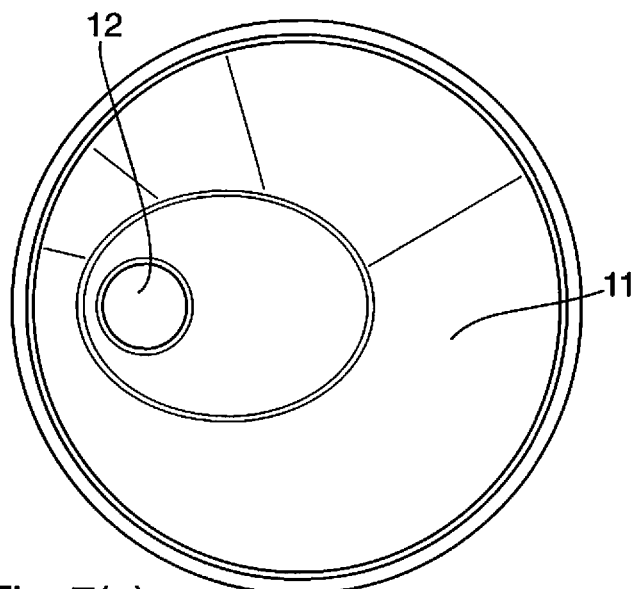
Fig. 7(a)
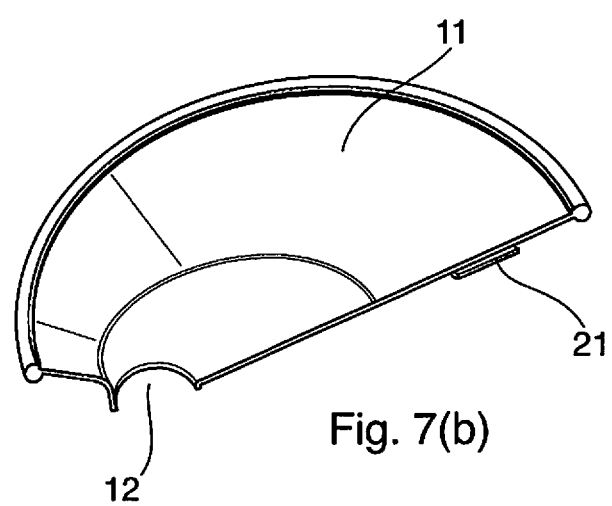
Fig. 7(b)
Fig. 7(c)
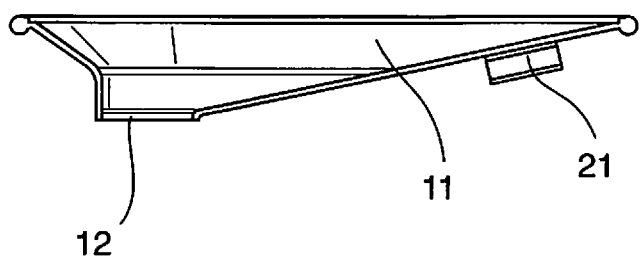

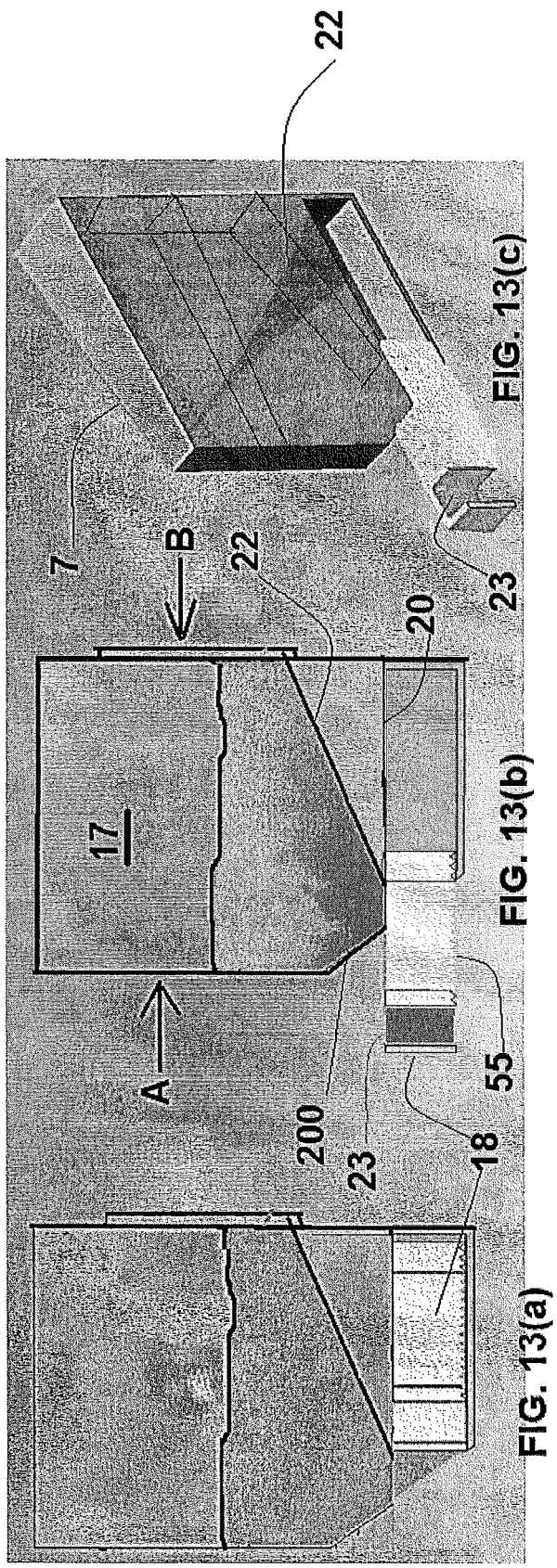
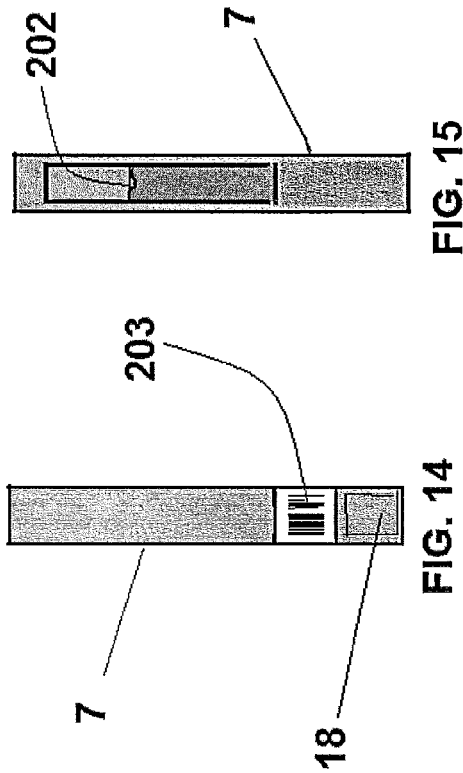
FIG. 13(a)   FIG. 13(b)   FIG. 13(c)
FIG. 14
FIG. 15

AUTOMATED DISPENSER AND METHOD FOR DISPENSING

FIELD OF INVENTION

The invention relates to an automated dispenser for dispensing spices, teas, condiments, herbs, powdered beverages, or ground coffees or mixtures thereof, and more particularly to a dispenser that automatically dispenses variable quantities thereof from a plurality of pre-filled cartridges adapted for specific use in such dispenser, in accordance with a pre-selected and pre-programmed list of choices.

BACKGROUND OF THE INVENTION AND DESCRIPTION OF THE PRIOR ART

The storage and use of spices, extracts, herbs such as herbal teas and tea leaves, condiments such as sugar, sweeteners, and creams (natural and artificial), powdered beverages, and ground and/or flavoured coffee beans, is problematic in that same are usually stored in their individual containers, with consumers manually measuring spoonfuls thereof to obtain the desired quantity thereof in preparing foods or beverages. Consumers however want the ability to instantly create a vast number of culinary spice mixtures that can be used for cooking (i.e. for various meat seasonings or pastes or sauces), and/or for desired mixtures of powdered flavourings, teas, ground coffee beans, sweeteners, and the like, for beverages.

This demand is currently being met through the use of pre-packaged and/or pre-blended spice mixtures or through pre-packaged coffee and/or tea blends or other flavoured powdered beverage blends. However, there is no appliance that allows the consumer to both store and automatically select and dispense a prescribed or programmed quantity and selection of different spices, condiments, herbs, ground coffees and flavourings and condiments, and in particular no such device exists which provides for a series of refillable cartridges of unique contents, each mountable on a carrier which is alignable or may be aligned with a dispensing means such as a spindle to open one or more selected cartridges to allow quantities of the contents thereof to be dispensed.

For example, U.S. Pat. No. 618,219 entitled a "Revolving Cannister" teaches a plurality of spice compartments (not removable cartridges) which may be manually rotatable to allow a user to manually select, and measure, a quantity of spice to be selected from a desired compartment. This patent, however, fails to teach a rotatable selector arm which rotates on command to a particular spice compartment (cartridge) in order to dispense a predetermined quantity of spice from one or more selected spice compartments.

Other patents such as U.S. Pat. No. 607,716 and U.S. Pat. No. 502,453, relate to a spice storage and dispensing cabinet, but those devices are manually operated by the user and do not disclose an automated actuator arm which automatically selects a desired dispenser, in accordance with a selected spice or blend of spices. Nor are either of those devices equipped with the means to dispense a predetermined quantity or mixture of spice.

U.S. Pat. No. 7,311,233—US Publication 2005/0247730—teaches a dispensing device for dispensing powdered pigments of paints, dyes, caulking, or powdered cosmetics. It discloses a rotatable turntable having a plurality of containers. A screw type "pump" is shown for dispensing a quantity of powder from an individual container. A weighing means may be used to weigh the amount of material dispensed via a "coarse" screw, with finer adjustments to the material being dispersed being made with a "fine" screw adjustment. Depending on the amount of material to be dispersed, the screws are rotated a calculated number of times to yield the required amount of product. The device, however, rotates the cartridges on a turntable as opposed to keeping the cartridges fixed and rotating a rotary or trigger arm to obtain the desired product. Moreover, the device as taught in US '233 fails to disclose a means to automatically dispense a desired (variable) amount of product from various containers in sequence. The containers are also to be manually refilled and the patent does not disclose the use of pre-filled cartridges for the device.

Finally, U.S. Pat. No. 4,776,489 discloses a herb and spice dispenser that manually dispenses a premeasured amount of stored herbs and spices. The device is equipped with a housing that has separate spice and herb storage compartments, and a measured dispenser associated with each compartment. Each compartment also includes a vibrating device for breaking up the spices and stored therein. The consumer pushes a button, which opens the individual spice compartment and allows the spices or herbs therein to fall downwardly to the lower compartment The button is held until the preselected quantity of herbs or spices is obtained from an individual compartment, which is visibly determined. The process is simply repeated if more than one spice is desired. A removable shaker is manually shifted laterally underneath the storage compartments in order to collect the spices dispensed. The device does not, however, provide a means to automatically dispense a desired quantity from a selected spice cartridge or cartridges, nor does it disclose an automated selector arm which may be activated to dispense spices from various cartridges or containers in sequent. The device also specifies that each compartment is to be refilled with spice or herbs, and does not disclose the use of a plurality of replaceable spice and herb cartridges.

The prior art is therefore deficient in that it fails to disclose a device that is truly automated and allows a consumer to obtain a desired mixture spices, herbs, powdered beverages, coffees, teas, or condiments in the correct and desired quantities and proportions, without the need to manually dispense the various spices or condiments.

This background information is provided for the purpose of making known information believed by the applicant to be of possible relevance to the present invention. No admission is necessarily intended, nor should be construed, that any of the preceding information constitutes prior art against the present invention.

It is therefore useful to provide for a device that allows the consumer to automatically select one or more pre-programmed mixtures, or, to automatically dispense an individual spice(s), herb(s), tea(s), coffee bean mixture(s) in the quantity or and "blend" selected by the user or programmed by the user.

SUMMARY OF THE INVENTION

In order to avoid having to manually dispense various spices and herbs as outlined in the prior art from a series of containers, the invention teaches a dispenser that is automated and automatically and conveniently consistently dispenses a precise desired quantity and mixture of one or more different spices, herbs, teas, powdered beverages and/or ground coffees. Such automated dispenser further gives the user the ability to select and rapidly receive various popular blends of beverage mixes, ground coffees or teas or the like, with or without desired condiments or seasonings such as creams, sugars, salt or other spices, without having to individually laboriously measure out such quantities, with reference to a written recipe or the like.

Advantageously, the automated dispenser of the present invention allows the user to select, from numerous pre-programmed series of popular blends and mixes, a particular blend, and to rapidly have delivered to a receptacle in such automated dispenser, such blend, mixed or unmixed with water.

The automated dispenser may be adapted for simply dispensing spices or blends of teas, herbs, or coffees, for subsequent use, or alternatively or advantageously may be further combined with heated water or brewing means to dispense heated or brewed coffees or teas using blended teas or coffee mixes as selected by the user of the automated device.

Accordingly, in a first broad aspect of the automated dispenser of the present invention, such dispenser comprises:
(a) a plurality of cartridges, adapted to be individually filled, respectively, with one of the items selected from the group of items comprising said spices, herbs, teas, condiments, powdered or flavoured beverages, and ground coffee beans;
(b) a cartridge carrier adapted to hold said plurality of cartridges;
(c) a dispensing means, comprised of a least one spindle or rotary arm, which when activated, engages with a slider member to trigger dispensation by gravity of a calibrated amount of one of said items, from a selected cartridge;
(d) said dispensing means adapted for relative movement with respect to said cartridge carrier; and
(e) a memory look-up table, containing a plurality of separate, discrete dispensing programs for operation of the dispensing means and said spindle or rotary arm to dispense quantities of said items from various of said cartridges, wherein when a dispensing program is selected by a user, the dispensing program aligns the dispensing means relative to the cartridge carrier and, in particular, a selected cartridge to:
(i) dispense a particular quantity of said items;
(ii) and, in the case of a selected mix of said items, to subsequently align with other selected cartridges to provide, from said cartridges, a desired mix of said items.

In a first refinement, the cartridge carrier is stationary and the dispensing means moves, preferably in a circular arc, relative to the said cartridge carrier, to the location of a specific cartridge.

In an alternate refinement, the dispensing means is stationary and cartridge carrier moves, preferably in a circular rotational manner, relative to said dispensing means, to allow the dispensing means to be aligned with a specific cartridge, to allow a desired quantity of said spice, herb tea, condiment, and/or ground coffee contained in said selected cartridge to be dispensed therefrom.

In a preferred embodiment of the automated dispenser of the present invention, such comprises:
(a) a plurality of cartridges, adapted to be individually filled, respectively, with one of the items selected from the group of items comprising spices, herbs, teas, condiments, and ground coffee beans;
(b) a cartridge carrier adapted to hold said plurality of cartridges in a radially spaced and contiguously arranged circumferential manner around said vertical axis of said cartridge carrier;
(c) a dispensing means, comprised of a least one spindle or rotary arm extending radially outwardly from said vertical axis, which when activated, engages with a slider member to trigger dispersal by gravity of a calibrated amount of spice, herb, condiment, or powdered beverage, from a selected cartridge;
(d) said dispensing means adapted for circular movement relative to said cartridge carrier about said vertical axis;
In a further embodiment of the invention, such invention comprises a method for dispensing spice, herbs, condiments, and/or ground coffee via an automated dispenser having any of the configurations as recited above, said method comprising the steps of:
(i) a user selecting a dispensing program;
(ii) said dispensing program thereafter aligning one or more of said cartridges with said dispensing means to dispense quantities of said spice, condiment, herbs, teas, ground coffee or granulated beverage, from one or more of said cartridges.

In a preferred embodiment, the spice and condiment dispenser comprises:
an outer housing or canister made of plastic injection molding with a receptacle area to receive the spices, and fitted with a viewing screen and a number of controls to, and preprogrammed to, automatically dispense a desired selection of spices and herbs;
a cartridge carrier made of plastic injected molding designed to hold a plurality of cartridges filled with spices and condiments;
a cartridge carrier made of plastic injected molding designed to hold a plurality of cartridges filled with spices and condiments;
a dispensing means located about vertical axis of the cartridge carrier, comprised of at least one spindle member coupled in the centre to a motor which rotates the spindle or rotary arm to the desired cartridge on the stationary cartridge carrier. In another embodiment of the invention, the dispensing means remains stationary and the cartridge carrier is attached to a gear mounted motor which rotates the cartridge carrier to align a specific cartridge with the dispensing means;
a slider and dispensing hook or trigger attached to a stepper motor on the spindle member (collectively referred to as the "dispensing means"), which stepper motor controls movement of the dispensing means to engage a cartridge;
a stationary funnel positioned below the dispensing carrier made of highly polished injection molding, with all surfaces sloping down towards the direction of the funnel opening, which is preferably but not necessarily offset from a centre axis of the funnel;
at least one vibration motor attached to the funnel, which when activated vibrates the funnel during the dispensing sequence;
a plurality of cartridges that each attach to the cartridge carrier and are capable of being removed and replaced when a cartridge is empty;
cartridges that are constructed with an upper storage chamber and a lower dispensing chamber; and
a lower dispensing chamber that contains a dispensing drawer with one or more elongated slots or cavities, calibrated to each hold ⅛ tsp of spice or condiment.

The invention is provided, in a refinement thereof, with a plurality of replaceable cartridges, with each cartridge preferably being sealed and containing a specific spice, condiment, herb, tea, ground coffee, or powdered or granulated beverage, as selected by the user. The individual cartridges are inserted into a circular cartridge carrier that is slotted to accommodate the cartridges. To ensure that each mix or recipe contains the correct proportion of spices, each cartridge may be bar-coded or possess other means for unique recognition and identification by the microprocessor for the invention. A microprocessor may be provided, which may further rely on various sensors to sense the location of a particular cartridge and its circumferential position on the cartridge carrier, and/or to provide feedback when the preselected measured amount of spice and condiment is dispensed from a cartridge.

The cartridges are preferably each equipped with an upper storage chamber and a lower sliding dispensing chamber. The lower dispensing chamber contains a slidable drawer of known fixed volume, that has one or more slots or cavities in its bottom. When engaged, the drawer slides out and allows a known or calibrated amount of the spice or herb to fall down through the slot or cavity onto the funnel, which has an off-centre opening directly above the receptacle used to collect the spice and/or condiments. Attached to the funnel is at least one vibration means, powered preferentially by an electric motor, which when activated vibrates the funnel to facilitate the movement of the spice, powdered beverages, teas, herbs, condiments, or ground coffees down the funnel towards the receptacle.

Through an electronic user interface, such as a microprocessor having programmed or programmable series of instructions, user has the ability to create an unlimited number of spice blends or to select one of the many popular or proprietary pre-programmed spice mixes. The programming utilizes an EPROM chip, or other equivalent memory means to direct the spindle to the location of various cartridges to be sourced for a variety of spice mixes. The automated dispenser is equipped with a viewing screen and a number of controls on the front of the invention that allow the user to scroll through the recipes, select and set favorite blends, adjust quantities to be dispensed, and activate the invention to dispense a particular mix. The cartridges may further be provided with viewing means on the individual cartridges to allow a user to become aware of amounts of spice, etc, dispensed from the various cartridges and which cartridges are in need of replenishment or replacement by replacement of a pre-packaged quantity of spice, etc.

Accordingly, in a preferred embodiment, the controls are configured to activate a microprocessor to allow the user to:
1. dispense an individual spice, condiment, herb, or powdered beverage;
2. dispense a spice blend;
3. save favourite pre-programmed mixes;
4. dispense a favourite mix; and/or
5. check a spice cartridge to determine the amount of spice remaining.

In a broad aspect the invention comprises the following mechanical sequence of events that occur once the user has selected or programmed the desired recipe of spices and/or condiments and has initiated the dispensing sequence, namely:

a dispensing carrier rotates within a 360 degree horizontal plane to align a dispensing means with a specific spice or condiment cartridge;

a stepper motor actuates a rotary arm or slider to cause same to move radially out to engage a dispensing drawer of a cartridge, which, in one embodiment, possesses a dispensing hook, trigger, or mechanical release lever;

once the slider/arm reaches an apex of travel, a solenoid activates to move the dispensing hook, trigger, or mechanical release leaver to engage a lower dispensing chamber located at the base of the cartridge, to move the dispensing chamber and withdraw it from the cartridge to thereby dispense a desired quantity of spice/condiment; and a spring attached to the lower dispensing chamber, biased to maintain the said dispensing chamber in a closed position, thereafter returns the dispensing chamber to a closed position.

In one embodiment, the lower dispensing chamber is rectangular shaped, with at least one rectangular opening, slot or cavity located towards the trigger side of the lower dispensing chamber.

A slot or cavity in the said dispensing chamber is calibrated to contain a fixed quantity, such as ⅛ teaspoon of spice or herbs. Thus with each full movement of the said dispensing chamber a multiple of ⅛ teaspoon of spice or herbs is dispensed, depending on the number of slots or cavities, or the number of times the dispensing chamber is moved from the closed to open position.

As the stepper motor moves further, the slider moves in a radial direction towards the centre, which in turn pulls the spring loaded dispensing chamber out of the cartridge. As the said dispensing chamber moves in a radial direction towards the centre, the spices or condiments in the slots or cavities of the dispensing chamber fall down by gravity into the funnel.

The above process is repeated with another cartridge, until the preselected amount of a spice or mix of spices is obtained, with each pull of the dispensing chamber allowing a multiple of ⅛ tsp of spice or condiment to fall down onto the funnel, depending on the number of slots and whether there is a partial or full pull of the said dispensing chamber. As the trigger activates to pull the said dispensing chamber, a vibration motor may be further actuated, which vibrates the funnel to facilitate moving the spice and condiment down the funnel incline towards the receptacle;

Once the desired quantity of spice from a cartridge has been obtained, a solenoid causes a trip lever to activate, thereby releasing the trigger and causing the said dispensing chamber to return to the closed or biased position; and the dispensing means then automatically rotates as programmed to the next spice or condiment cartridge and the process is repeated until the entire spice or condiment mix is dispensed.

In a further alternative embodiment of the invention, the cartridge carrier is coupled in its centre to a motor, which rotates the cartridge carrier relative to the dispensing means (which inter alia comprises a spindle) which remains stationary. Once a particular selected cartridge is rotated a programmed number of degrees to align with the stationary dispensing means, an arm or spindle forming part of the dispensing means is activated, as previously described, to initiate the engagement of the dispensing chamber of a cartridge and to dispense a pre-selected quantity of spice. Once the dispensing sequence is completed, the cartridge carrier then rotates a programmed number of degrees to align the dispensing means with another cartridge, and the dispensing sequence is repeated until all of the desired spices have been dispensed.

In this further alternative embodiment of the invention, the dispensing means functions in the same manner as previously described once a selected cartridge is aligned with a slider and dispensing hook or trigger, as does the operation of the funnel during the dispensing sequence.

In another broad aspect of the present invention, the invention comprises a method for dispensing spice, herbs, condiments, teas, ground coffee beans and/or powdered beverages via an automated dispenser, wherein said automated dispenser comprises:

(a) a plurality of cartridges, adapted to be individually filled, respectively, with a variety of spices, herbs, condiments, teas, ground coffee beans and/or powdered beverages;

(b) a cartridge carrier, having a vertical axis, designed to hold said plurality of said cartridges in a radially spaced and contiguously arranged circumferential manner around said carrier and a vertical axis thereof;

(c) a dispensing means, comprised of a least one spindle or rotary arm extending radially outwardly from said vertical axis, which when activated, engages with a slider member to trigger dispersal by gravity of a calibrated amount of spices, herbs, condiments, teas, ground coffee beans or powdered beverage, from a selected cartridge;

(d) said dispensing means adapted for circular movement relative to said cartridge carrier about said vertical axis; and (e) a memory look-up table, containing a plurality of separate, discrete dispensing programs for directing relative motion of the dispensing means relative to said cartridge carrier to dispense a particular variety of mixtures and quantities from said cartridges, wherein when a dispensing program is selected by a user, the dispensing program aligns the dispensing means relative to the cartridge carrier and, in particular, a selected cartridge to:

(i) dispense a particular quantity of spice or condiment;

(ii) and, in the case of a mix, to subsequently align with other selected cartridges to provide, from said cartridges, a desired mix of spice, herbs, condiments, teas, ground coffee beans and/or granulated beverage;

said method comprising the steps of:

(i) a user selecting a dispensing program;

(ii) said dispensing program thereafter aligning one or more of said cartridges with said dispensing means to dispense quantities of said spice, condiment, herbs, teas, ground coffee beans or granulated beverage, from one or more of said cartridges.

In a still further broad aspect of the present invention, such invention comprises a novel cartridge adapted for use in any of the automated dispensers as described above.

In one embodiment thereof, a novel cartridge is provided, which is adapted for use in an automated dispenser, for containing items selected from the group of items comprising spices, herbs, teas, condiments, powdered beverages and ground coffees, such cartridge comprising:

(i) two compartments, namely an upper storage chamber and a lower dispensing chamber;

(ii) a slidable member, of known volume, situated at a base of said dispensing chamber, which when slidably actuated allows dispensation of a known volume of said item contained in said cartridge;

In a further embodiment, the novel cartridge of the present invention further comprises:

(iii) transparent viewing means for viewing quantities of said item remaining in said cartridge.

In a still-further embodiment, the novel cartridge of the present invention further comprises:

(iv) individual recognition means, to allow said automatic dispenser to individually uniquely identify said cartridge and its contents.

In a refinement of this further embodiment, the individual recognition means comprises a bar code applied to an external surface of the cartridge, with an associated scanner being present on the automated dispenser, to thereby allow the automated dispenser to register the location of a particular cartridge and its contents, when the cartridge is placed on the cartridge carrier. In a further refinement, the individual cartridge recognition means may comprise an RFID (radio frequency identification) tag or chip, in either an active format (with battery) or passive format (without battery), as commonly now employed in the art in identifying products by the radio signal emitted by the chip which is attached or embedded in the product. In an alternative refinement, the individual recognition means may comprise a unique structural configuration, unique for and indicative of the particular contents of the cartridge. Such unique structural configuration may comprise, but is not limited to, a protruding tab which is uniquely positioned on the surface thereof for all of the cartridges intended to dispense similar items, which uniquely positioned tab interfaces with sensor means on the cartridge carrier of the automated dispenser, to thereby allow the automated dispenser to determine the contents, and position of, a cartridge when located on the cartridge carrier of the automated dispenser.

In a still further embodiment of the novel cartridge of the present invention, the slidable member within the novel cartridge is resiliantly biased by a spring, to bias the slidable member in either an open or a closed position, for subsequent engagement by the slider member on the automated dispenser which forms part of the dispensing means. In such embodiment the rotary arm or spindle of the automated dispenser will actuate the slidable member itself, or alternatively a trigger member, to cause the slidable member to move to the open position and thereby allowing dispensation of a quantity of spice, etc., from the cartridge, thereby elongating the spring, whereupon after dispensing, the spring withdraws the slidable member within the cartridge. Alternatively, the slidable member may have a toothed track, adapted to engage a similarly toothed gear coupled to a motor coupled to the automated dispenser, which, when the motor is actuated, causes the slidable member to be extended, and the motor, when actuated in the opposite direction, causes retraction of the slidable member back into the cartridge.

In a refinement of the invention, the automated dispenser may have a USB port, in electronic communication with the look-up table. Such components thereby allow various recipes or blends of spices to be downloaded from the worldwide web onto the dispenser, in particular the look-up table thereof, to allow re-programming of the look-up table to provide alternate and greater variety of spice blends and mixtures to the user.

BRIEF DESCRIPTION OF THE DRAWINGS

The accompanying drawings, which illustrate one or more exemplary embodiments and are not to be construed as limiting the invention to those depicted embodiments, each of which are intended to be non-limiting, in which:

FIG. 7(a)-(c) are views of the offset funnel details showing three (3) different views of same: FIG. 7(a) shows a top perspective (upper left hand diagram); FIG. 7(b) shows a bottom perspective (middle diagram); and FIG. 7(c) shows a side perspective (lower right hand diagram), all showing the different profiles of the funnel with surfaces sloping down to the funnel opening;

FIG. 13(a) is a side view of the novel cartridge of the present invention, shown in side view, in partially-filled condition, with the slidable member shown in the retracted (closed) position;

FIG. 13(b) is a view of the cartridge of FIG. 13(a), with the slidable member shown in the extended (dispensing) position;

FIG. 13(c) is a perspective view of the novel cartridge shown in FIG. 13(b);

FIG. 14 is a view of the novel cartridge of FIG. 13(b), looking in the direction of arrow "A"; and FIG. 15 is a view of the novel cartridge of FIG. 13(b), looking in the direction of arrow "B";

DETAILED DESCRIPTION OF PREFERRED EMBODIMENTS

To gain a better understanding of the invention described herein, the following examples are set forth. It will be understood that these examples are intended to describe illustrative embodiments of the invention and are not intended to limit the scope of the invention in any way.

Figure 1:
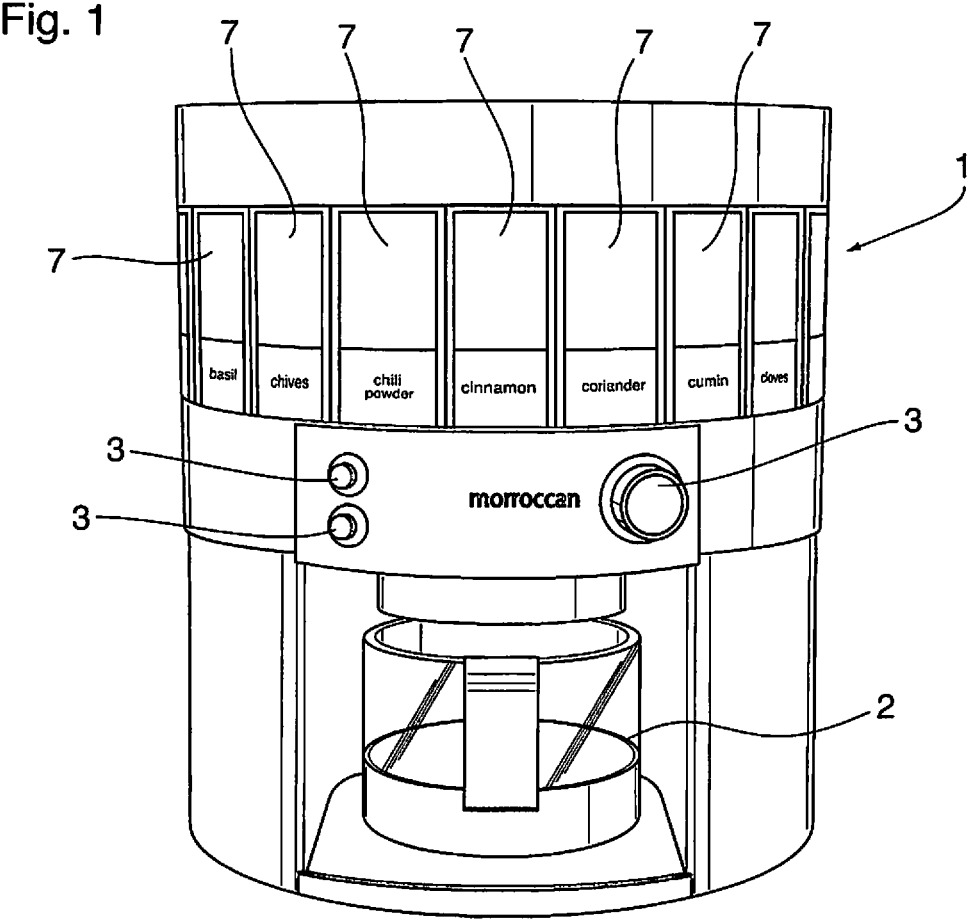
FIG. 1 is a view of an embodiment of the assembled automatic dispenser showing the outer housing, receptacle and controls for the dispensing of spices and condiments. The individually labelled cartridges are also shown located on the top of the canister, with the cartridges arranged contiguously in a circumferential manner around the dispenser.

FIG. 1 shows the outer housing of the automatic spice and condiment dispenser 1 and, in particular, the receptacle area 2 for the collection of the spices and condiments dispensed from the automated dispenser 1. The controls 3 for the automatic dispensing of the spices, herbs, teas, ground coffee, condiments, or mixtures thereof (hereinafter collectively referred to as the "spice or spices") are also shown and located directly above the receptacle area 2. The position of the individual spice cartridges 7 are also shown as they are contiguously arranged in a circumferential manner around the top of the dispenser 1, and mounted on cartridge carrier 6 (see FIGS. 3, 4).

Figure 2:
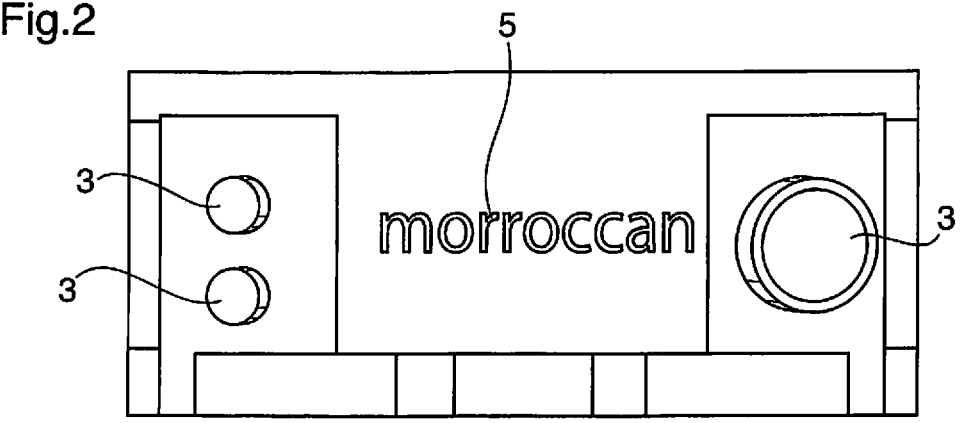
FIG. 2 is a close-up view of an embodiment of the control screen with controls for the dispensing of spices and condiments. Note that the reference to "morrocan" as displayed on the control screen, is one example of the name of a spice selected by the user after scrolling through the various mixes and spices stored in the invention.

FIG. 2 shows a close up view of one embodiment of the control screen 5 with controls 3 for the dispensing of spices. The controls 3 are linked directly to the microprocessor (not shown) which is programmed to actuate the various dispensing means, as described below, to dispense a known recipe or mix of spice, or a specific spice, which is permitted to be selected from a variety of spices and spice mixes, all having associated programmed instructions to allow the dispensing means to be operated to dispense the particular spices. The same microprocessor may further be programmed such that the invention is capable of dispensing a prescribed quantity of a specific spice, or a mix of spices.

The same control screen 5 is designed to allow the user using the controls 3, to scroll through the recipes and the individual spices contained in the dispenser and select whatever quantity of spice, or mix of spices, is desired. The same microprocessor and controls 3 rely on various sensors to provide feedback for the position of the dispensing means (not shown), and to identify cartridges 7 and their contents as further discussed below.

Figure 3:
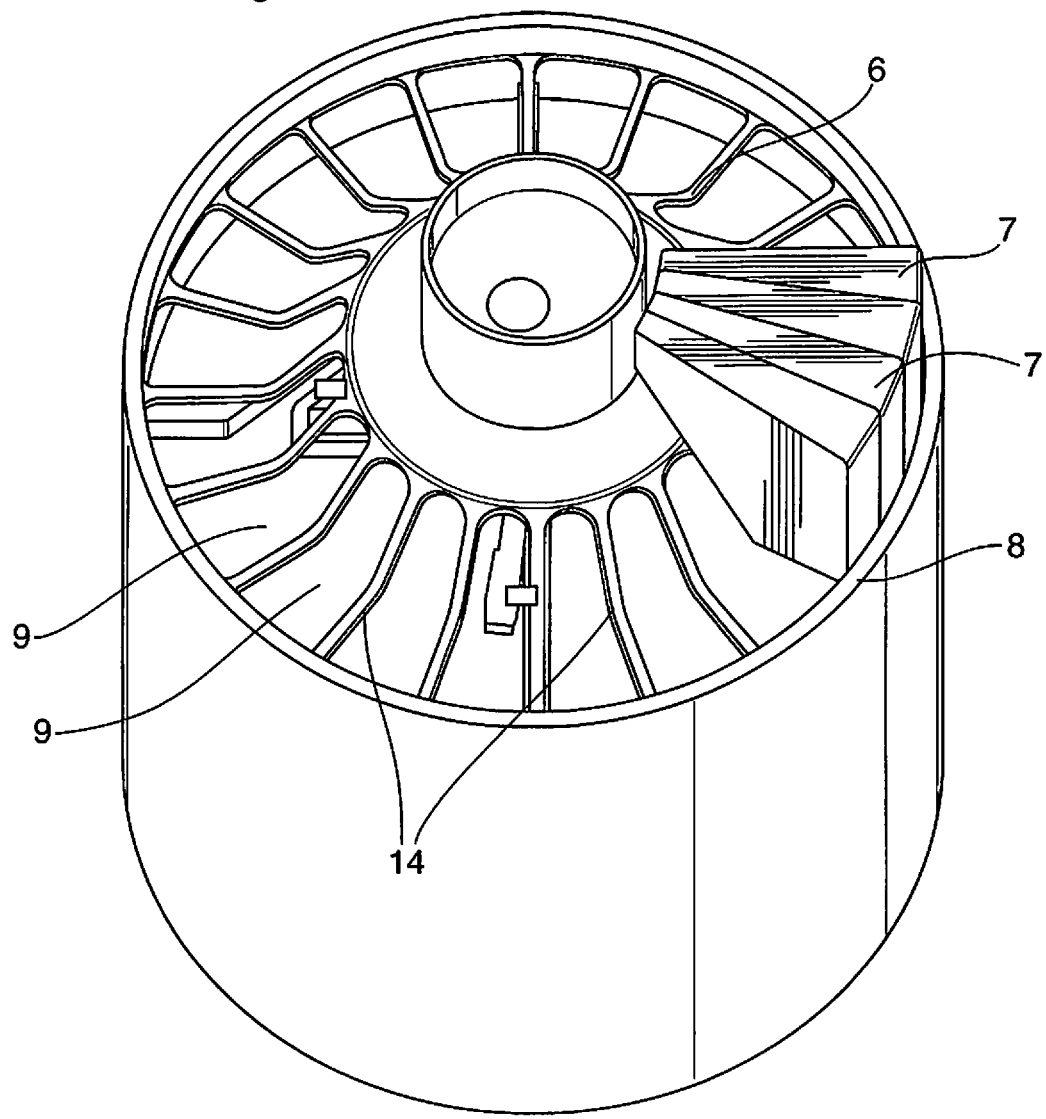
FIG. 3 is a top perspective showing an embodiment of the cartridge carrier and position of the spice cartridges within the outer housing of the dispenser.

FIG. 3 shows a perspective or view of the circular cartridge carrier 6 and relative position of the individual spice cartridges 7. In one embodiment of the invention, the cartridge carrier 6 is affixed to the outer housing 8 and, as such, remains in a stationary position. It is slotted via carrier ribs 14 not only to accommodate the individual spice cartridges 7, but in doing so, to allow the dispersal of spices from the spice cartridges 7 to fall by gravity down onto the funnel 11 and into the receptacle area (not shown), which will be more fully explained below. The individual cartridges 7 are arranged in a circumferential manner around the cartridge carrier 6 and are designed to be replaced when empty of spice.

Figure 4:
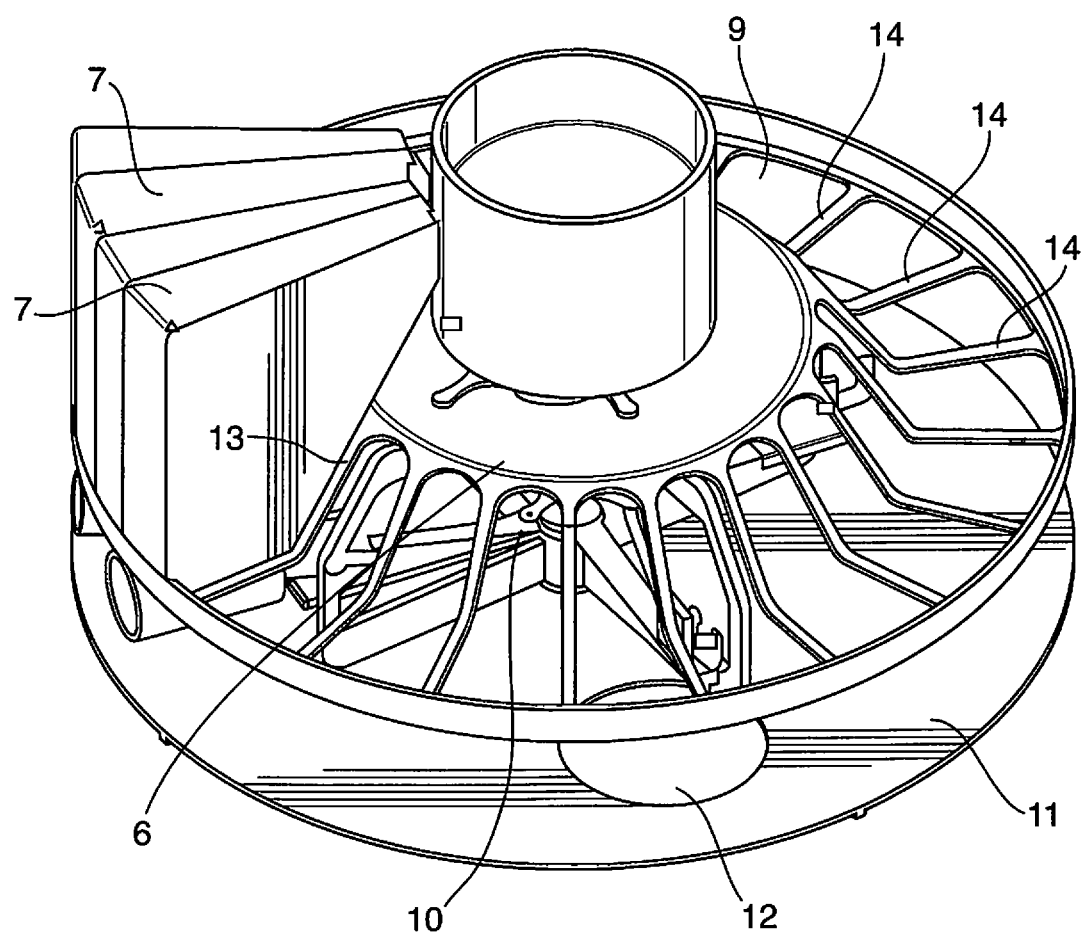
FIG. 4 is a top perspective showing the cartridge carrier and position of the underlying dispensing means and offset funnel with opening to the receptacle area.

FIG. 4 shows a top perspective of the cartridge carrier 6 in relation to the location of the underlining dispensing means 10 and offset funnel 11 with opening 12. This perspective view shows more closely the configuration of the slots 9 on the cartridge carrier 6, which shoulders 13 assist in positioning, locating, and maintaining the individual spice cartridges. The slots 9 in the cartridge carrier 6 are designed such that the cartridges 7 each rest on the ribs 14 on either side of the slots 9, as depicted. In one embodiment of this invention, the dispensing means 10, when activated, moves in a circular motion below the stationary cartridge carrier 6 to engage a particular spice cartridge 7, as described below.

Figure 5:
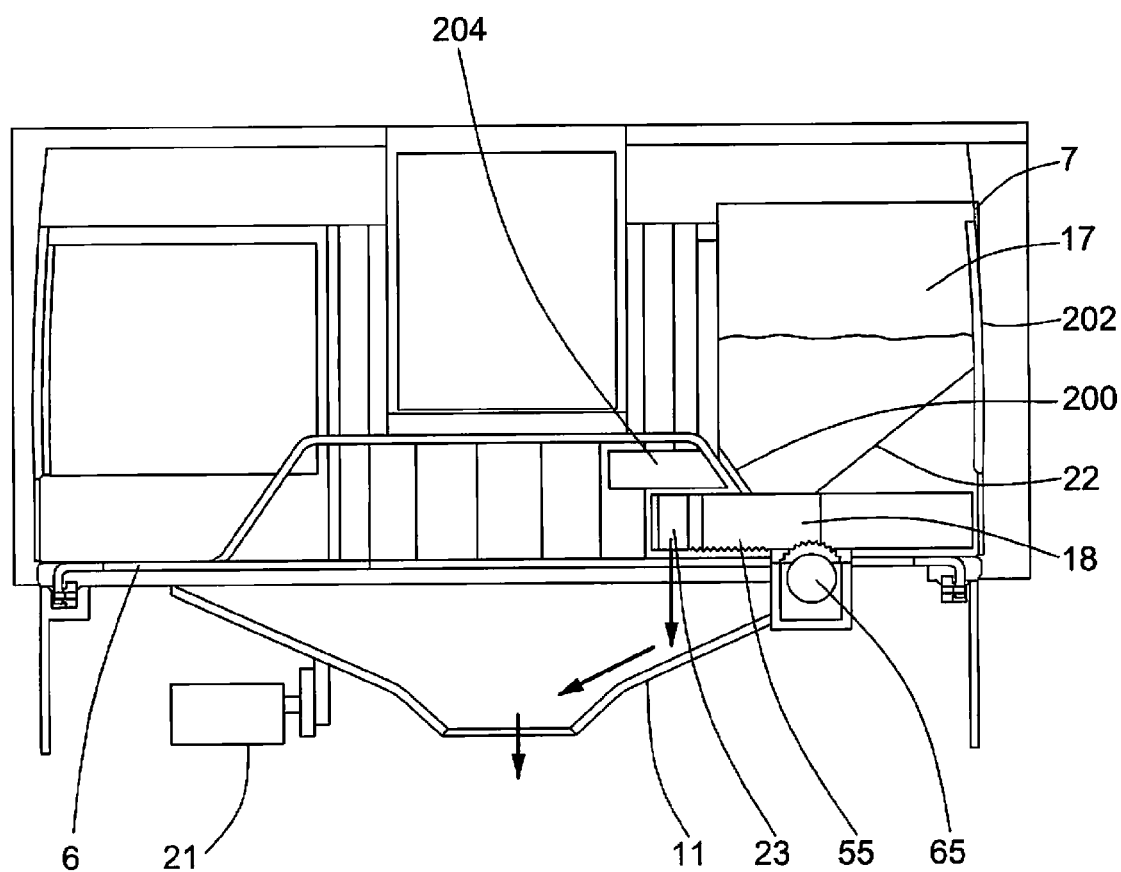
FIG. 5 is a top perspective of one embodiment of the dispensing means showing the dispensing means and activation of the stepper motor to extend the slider radially out to engage the cartridge, with the dispensing chamber being in the closed position.

FIG. 5 is a top perspective of the dispensing means 10 that rotates a number of degrees to align with a particular cartridge 7, in accordance with the programmed instructions for the selection of a particular mix or selection of a spice. In the preferred embodiment, a stepper motor 15 rotates the spindle 16 or rotary arm on the dispensing means 10 to move radially out to engage a bottom slidable chamber 18 on spice cartridge 7 on the dispensing means 1. Each cartridge 7 is comprised of an upper storage chamber 17 and a lower dispensing chamber 18.

Figure 6:
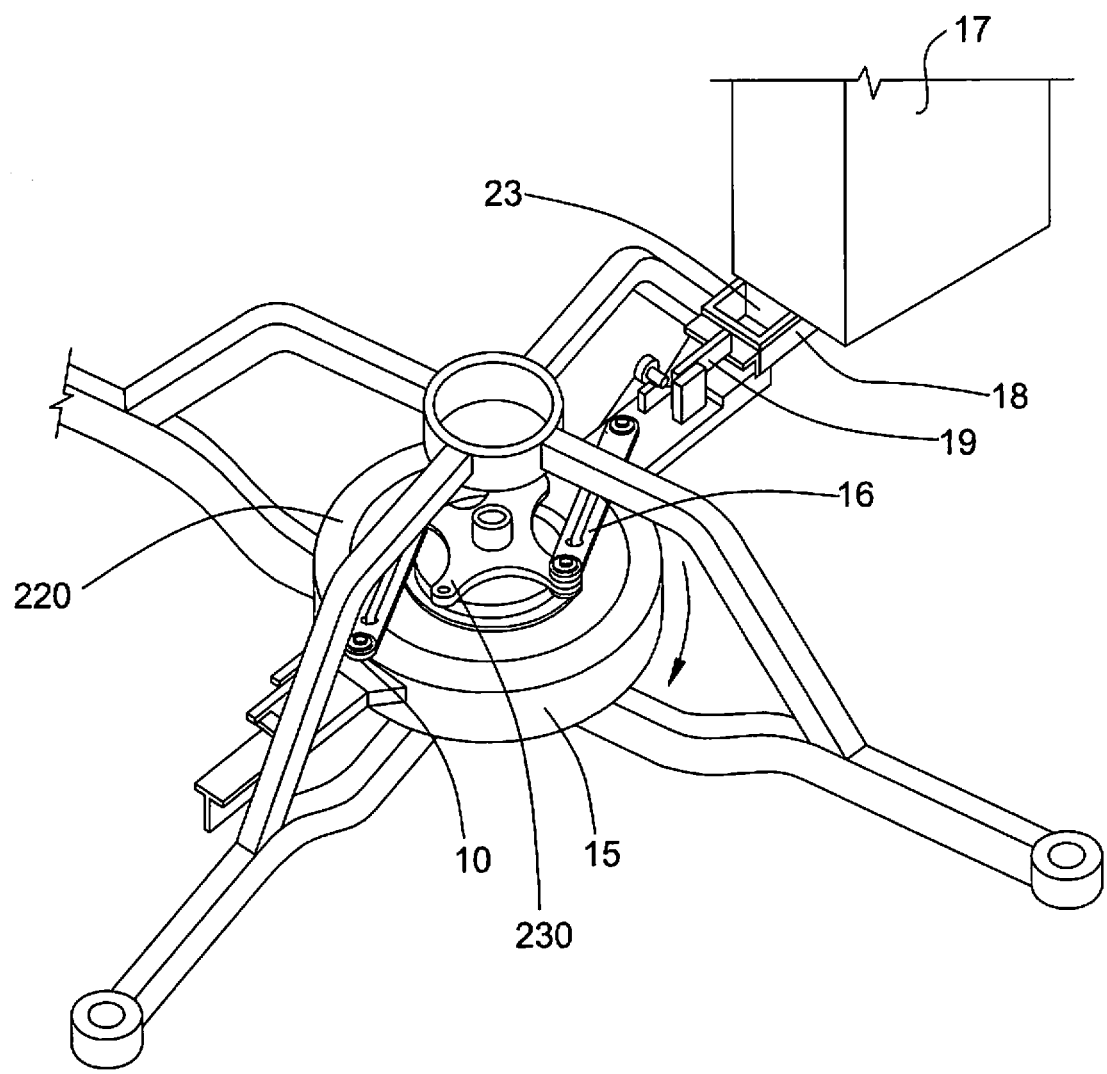
FIG. 6 is another top perspective of the dispensing means showing a subsequent step in the dispensing sequence, with the dispensing chamber of a cartridge being engaged and in the open position, allowing a measured quantity of spice to be dispensed.

FIG. 6 is a top perspective of one embodiment of the dispensing means 10 showing the movement of the lower dispensing drawer/chamber 18 of a cartridge 7 radially towards the centre of the dispenser 1. Lower dispensing chamber 18 is biased, via spring 20 sandwiched between backstop member 30 and inclined plate 22 in the interior of the cartridge 7, to maintain the lower dispensing drawer/chamber 18 in the closed (retracted) position. As the spindle 16 on the dispensing means 10 moves radially out and reaches its apex of travel, the trigger solenoid (not shown) moves the trigger 19 attached to the spindle 16 to allow the engagement with the lower dispensing chamber/drawer 18. As the stepper motor 15 rotates further, the spindle 16 moves back towards the centre of the dispenser 1 which pulls the spring-loaded lower dispensing chamber 18 out of the cartridge 7, allowing the spice in the lower dispensing chamber 18 to fall down by gravity onto the underlying funnel 11, and the spindle thereafter releases lower dispensing drawer/chamber 18, allowing it to be withdrawn back into the respective cartridge 7, and refilled by the spice in cartridge 7 then refilling hollow compartment 23 thereof. The process is repeated by the automated dispenser 1 -such motors 24 and/or 65 being governed by a series of programmed instructions provided in a look-up table (not shown) on a computer chip, until the desired quantity of spice from a particular cartridge 7 for a particular selected spice blend, is obtained/dispensed.

FIG. 7 shows three (3) different views of the offset funnel 11 details: a top perspective (upper left hand diagram); a bottom perspective (middle diagram); and, a side perspective (lower right hand diagram). The funnel 11, which is located below the cartridges, is constructed with an opening 12 to the receptacle area that is offset from the centre position. The surfaces of the funnel have varying slopes that are all inclined or sloped in a downward direction towards the opening 12 to the receptacle 2. Mounted to the underneath of the funnel 11 are one or more direct current vibration motors 21 which, when activated, vibrate the funnel 11 during the dispensing sequence. This agitation facilitates the movement of the spices down the funnel 11 through the funnel opening 12 into the receptacle area 2. The funnel is finished with a highly polished or honed material to reduce the friction and allow the spices dispensed to move more freely down the funnel 11 towards the receptacle 2.

Figure 8:
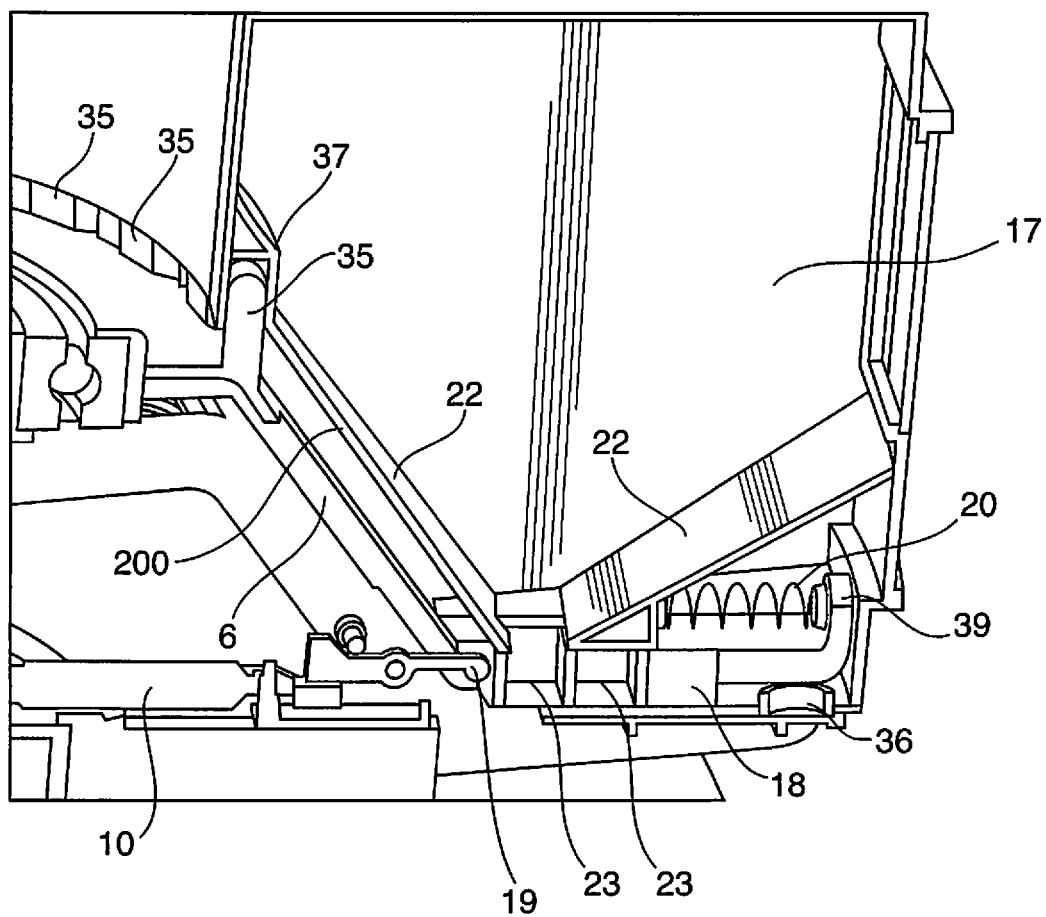
FIG. 8 is a side sectional view of a top perspective of a three dimensional view of a portion of the cartridge carrier showing the position of a cartridge on the cartridge carrier, and the lower dispensing chamber in the closed position.

FIG. 8 is a side section view of a cartridge 7 affixed to the cartridge carrier 6 showing the dispensing means 10 engaging the lower dispensing chamber 18 of a cartridge 7. The cartridges 7 are constructed with sloping inside walls 22 such that the spice contained within a cartridge 7 is automatically channeled or funneled by gravity downwards towards the opening in the lower dispensing chamber 18. The lower dispensing chamber 18 is constructed with one or more cavities or hollow portions 23 that are each calibrated to hold a predetermined quantity of spice (for example ⅛ teaspoon or ¼ teaspoon). The same lower dispensing chamber 18 is equipped with a spring 20 that is biased to hold the said dispensing chamber in the closed position until such time as the dispensing sequence is initiated. Once the dispensing sequence is initiated, the lower dispensing drawer 18 is pulled radially towards the centre thus allowing a calibrated quantity of spice to fall down by gravity onto the underlying funnel 11. In one embodiment of the invention, the dispensing means 10 moves the next cartridge 7 or cartridges and repeats the process (as programmed) until the entire mix is dispensed.

Figure 9:
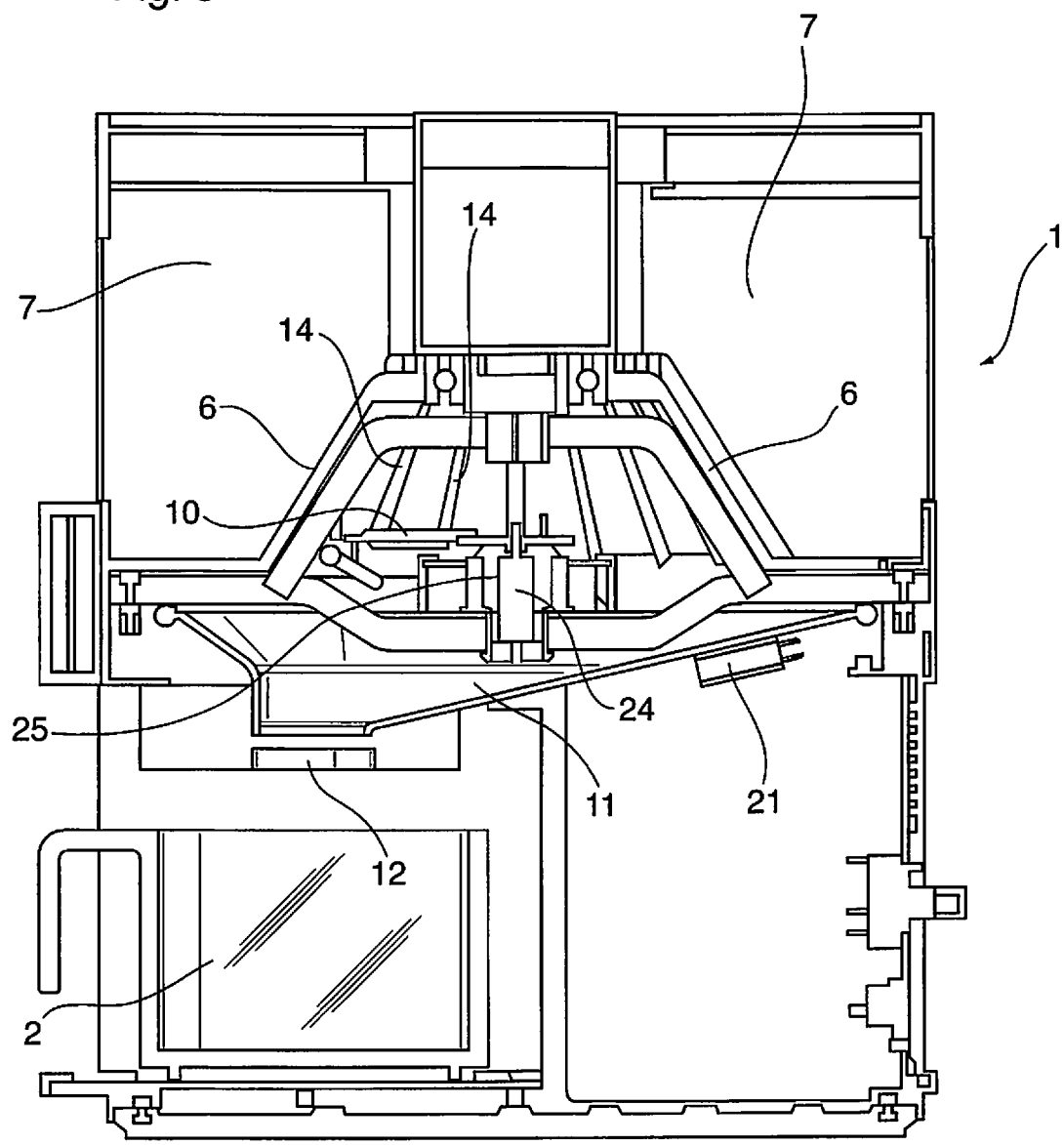
FIG. 9 is a cross section view of the assembled invention showing the relative position of the cartridge carrier, the underlying dispensing means, and offset funnel with opening to the receptacle area for the collection of spices and condiments.

FIG. 9 shows a cross sectional view of one embodiment of the automated spice and condiment dispenser 1 showing the operative features of the assembled invention. The location of a typical cartridge 7 is shown as being held to the cartridge carrier 6, with the bottom surface of the cartridge resting on the carrier ribs 14. The cartridges are held in place on the carrier 6 by a number of engagement points 35, 36, as further discussed herein, which allow the cartridges to be removed and replaced with a full cartridge once emptied of its contents. A gear motor 24 positioned on a motor mount 25 is used to rotate the dispensing means 10 which comprises, in part, a rotary arm or spindle 16, in a circular manner to the location of a desired cartridge 7, and to then repeat the process with other cartridges 7 until the entire spice mix is dispensed. Located below the cartridge 7 is a funnel 11, which is designed with an opening 12 offset to the centre thereof, positioned over the receptacle area 2 where the spices are collected. The surfaces of the funnel 11 all slope downwardly towards the receptacle area 2. The funnel is preferentially directly affixed to a vibration motor 21, as further shown in FIG. 5, to vibrate the funnel 11 during the dispensing sequence to facilitate the movement of spices down into the receptacle 2 where the spices are collected.

Figure 10:
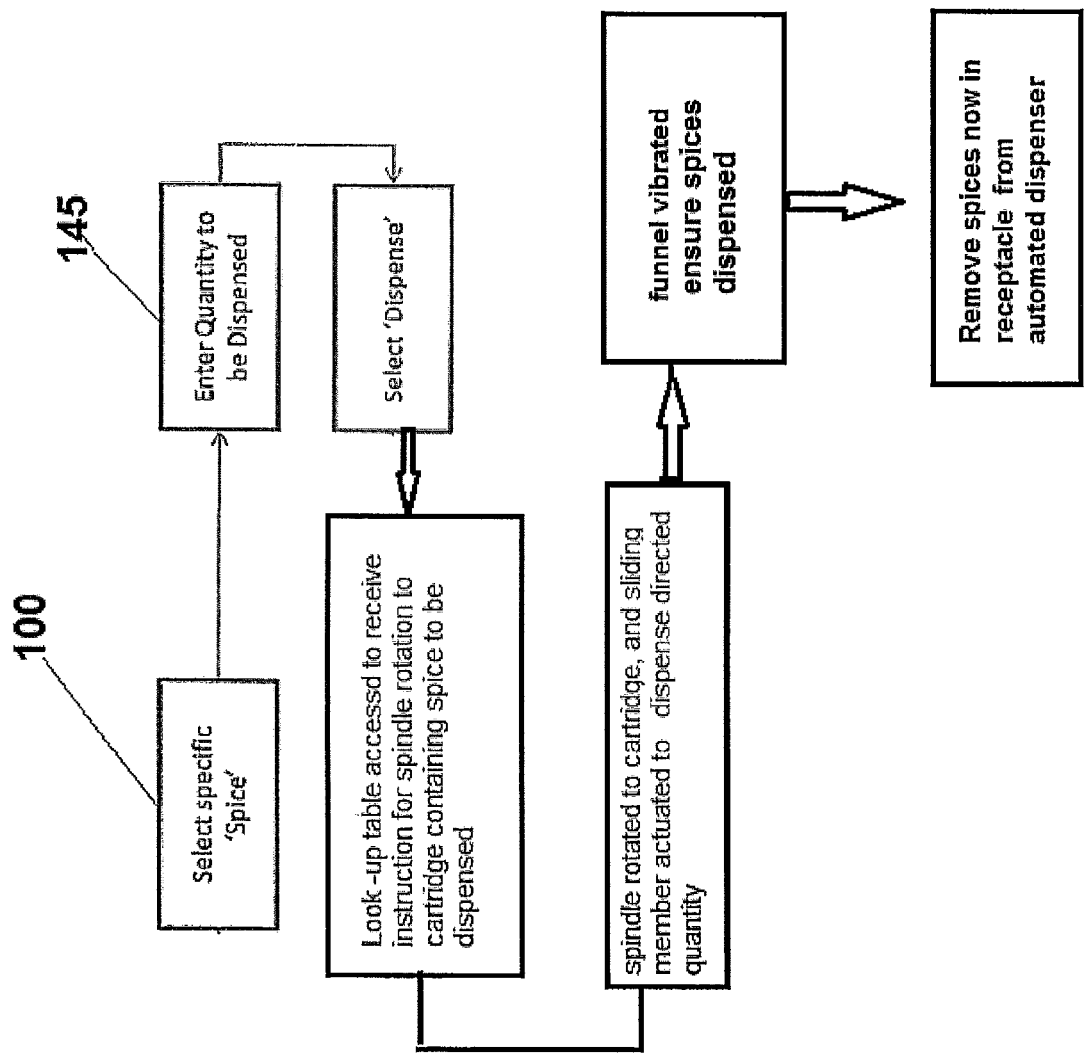
FIG. 10 is a schematic step diagram for dispensing an individual spice or condiment.
Figure 11:
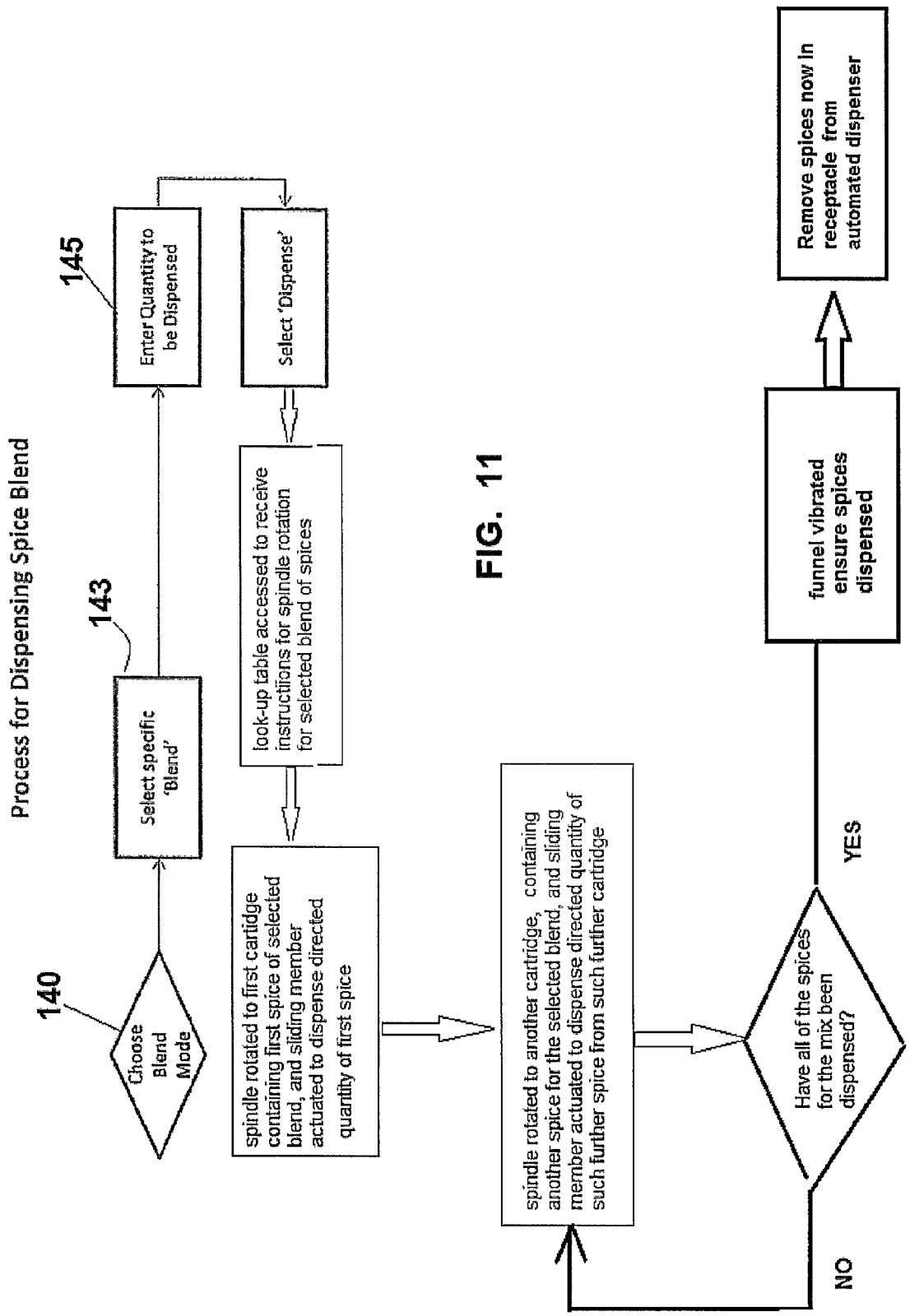
FIG. 11 is a schematic step diagram for dispensing a pre-programmed spice blend.
Figure 12:
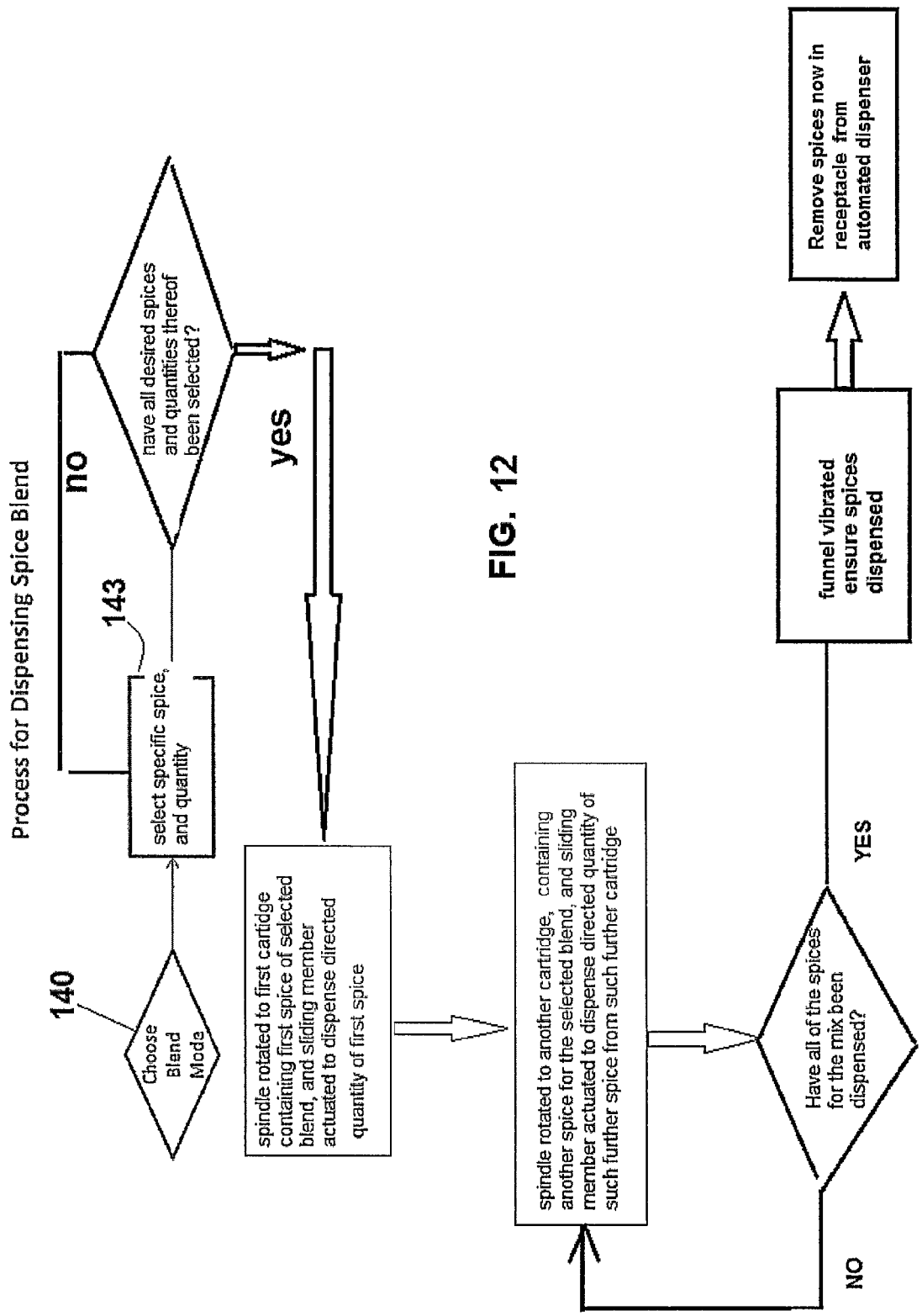
FIG. 12 is a schematic step diagram for manually selecting a blend of spices.

FIGS. 10-12 are schematic diagrams showing a method for operating, and the manner of operation of, one embodiment of the automated dispenser 1 of the present invention, wherein the cartridges 7 remain stationary and a dispensing means in the form of a rotatable spindle 16 is rotated by a motor 24 to individually dispense selected spice from one or more individual cartridges 7.

In this regard, FIG. 10 is a schematic diagram showing the sequential steps carried out by a user and by the automated dispense, when a single spice is selected to be dispensed from the automated dispenser 1 of the present invention, commencing with the user, at step 100, selecting a single spice to be dispensed, and thereafter at step 145 selecting the quantity to be dispensed.

FIG. 11 is a schematic diagram showing the steps carried out by a user and by the automated dispenser 1, in one embodiment thereof, when a pre-programmed blend of spices is selected to be dispensed from the automated dispenser 1 of the present invention, commencing with the user, at step 140, selecting the mode ("spice blend"), and thereafter, at step 143, selecting the particular spice blend, and thereafter at step 145, the quantity of such spice blend to be dispensed.

FIG. 12 schematic diagram showing the steps carried out by a user and by the automated dispenser 1, in one embodiment thereof, when a blend of spices is manually selected to be dispensed from the automated dispenser 1 of the present invention, commencing with the user, at step 140, selecting the mode ("spice blend"), and thereafter, at step 143, sequentially selecting respectively, the particular spice, and quantity of such spice to be selected.

FIGS. 13(a)-(c) show the novel cartridge 7 of the present invention, having an upper storage chamber 17 in partially-filled condition containing a particular spice, condiment, herb, tea, powdered beverage or ground coffee, with a bottom compartment 18 comprising a slidable member/drawer 18 which forms part of the dispensing means, shown in the retracted (closed) position [FIG. 13(a)], and in the extended (dispensing) position [FIGS. 13(b), (c)].

Bottom compartment/drawer 18 which forms a slidable member, having a hollow portion/compartment 23 therein of known volume, allows consistent dispensation of a known volume of item contained therein. Multiples of such known volume of such compartment 23 can be dispensed by repetitive opening and closing of bottom compartment 18 (i.e. using spindle 16 to actuate bottom compartment 18 in a back and forth manner to dispense multiples of compartment volume 23, or alternatively, where such bottom compartment/sliding member 18 possesses teeth 55, actuating motor and gear teeth 65 to cause the compartment to be extended from, and retracted into, the respective cartridge 7).

Specifically, as shown in FIGS. 13(a)-13(c), as well as FIG. 5, in contra-distinction to the embodiment shown in FIG. 8 and described above which employs a spring 20 and a trigger 19 (see FIG. 6) to release the bottom compartment/sliding member 18 to cause it to be withdrawn or extended from the associated cartridge 7, the embodiment depicted in FIGS. 13(a)-13(c), as well as FIG. 5 utilizes a series of teeth 55 on bottom compartment/sliding member 18 and a motor and toothed gear 65, in order to withdraw member 18 from cartridge 7, and to retract such member 18 into cartridge 7. In this regard, as best shown in FIG. 5, a motor and toothed gear 65 is used to provide the motive power, when actuated, to withdraw the bottom compartment 18 from a selected cartridge 7, and to return such bottom compartment 18 its usual position within the cartridge 7.

In a further refinement of the novel cartridge 7, as best seen from FIG. 15, transparent viewing means in the form of a window 202 is provided for viewing quantities of said item remaining in cartridge 7, to allow the user to determine when cartridge 7 needs refilling or replacement.

In a still-further embodiment, the novel cartridge 7 of the present invention possesses individual recognition means, to allow automatic dispenser 1 to individually uniquely identify cartridges 7 and their individual unique contents. In a preferred embodiment the individual recognition means comprises a bar code 203 applied to an external inclined surface 200 of cartridge 7 (see FIG. 14), with an associated bar code recognition device/scanner 204 (see FIG. 5) located on automated dispenser 1 at a location where it may scan one or more bar codes 203 applied to inclined surface 200 of individual cartridges 7. One such location for the bar code scanner 204 is proximate, and intermediate, a pair of carrier ribs 14, as shown in the embodiment depicted in FIG. 5.

Very advantageously, where the individual cartridges 7 possess identification/recognition means, the cartridges 7 need not always be consistently positioned in the same circumferential position on cartridge carrier 6 in order for automated dispenser 1 to correctly dispense, using pre-programmed instructions, the requisite spices from selected blends of spices. In this regard, frequently due to having to replace empty cartridges 7 with new cartridges containing pre-packed spices, a user often will inadvertently mix up the angular positioning of the cartridges 7 on the circumference of cartridge carrier 6. Without the dispenser 1 possessing individual recognition means to allow automatic dispenser 1 to individually uniquely identify cartridges 7 and their individual unique contents, subsequent use of the automated dispenser 1 would cause the dispenser 1 to incorrectly dispense spices and spice blends which would not correspond to those selected by the user. With the individual recognition means, such as a bar code 203 on each cartridge 7 as shown in FIG. 14, and bar code scanner 204 (as best shown in FIG. 5), the automated dispenser 1 is then able to recognize the circumferential position of each cartridge 7 and thereby recognize/know of its specific contents, and thereby dispense the correct blend of spices no matter n which circumferential position the various cartridges 7 and their associated spices are positioned on the cartridge carrier 6.

In an alternative refinement, the individual recognition means may comprise a unique structural configuration for each cartridge 7, with a mating configuration on cartridge carrier 6. In such manner, each cartridge may only be installed on cartridge carrier 6 in a particular circumferential position and always in a consistent angular orientation to each of the remaining cartridges 7. Specifically, such unique structural configuration may comprise, but is not limited to, upper protruding tabs 35 uniquely positioned on the surface of the cartridge carrier 6, which matingly engage a corresponding uniquely-positioned passage or aperture 37 (see FIG. 8) in each cartridge 7, to ensure consistent angular location of each cartridge 7 on cartridge carrier 6 so as to consistently remain in consistent location thereon relative to each other. A lower protruding tab 36 may further be provided on the base of each cartridge 7, or alternatively on the base of cartridge carrier 6, to further aid in uniquely positioning each cartridge on cartridge carrier 6, or simply to assist in similarly securing all cartridge 7 on cartridge carrier 6 during rotation thereof, as seen in individual recognition means The above disclosure represents embodiments of the invention recited in the claims. In the preceding description, for purposes of explanation, numerous details are set forth in order to provide a thorough understanding of the embodiments of the invention. However, it will be apparent that these and other specific details are not required to be specified herein in order for a person of skill in the art to practice the invention The scope of the claims should not be limited by the preferred embodiments set forth in the foregoing examples, but should be given the broadest interpretation consistent with the description as a whole, and the claims are not to be limited to the preferred or exemplified embodiments of the invention.

We claim:

1. An automated spice, herb, condiment, tea, powdered beverage, and/or ground coffee dispenser, comprising:
    (a) a plurality of cartridges, adapted to be individually filled, respectively, with one of the items selected from the group of items comprising said spices, herbs, teas, condiments, powdered beverages, and ground coffee beans;
    (b) a cartridge carrier adapted to mount and hold said plurality of cartridges;
    (c) dispensing means, comprised of a least one spindle or rotary arm, which when activated, engages and extends a sliding member from within a respective cartridge, to trigger dispensation by gravity of a calibrated amount of one of said items, from a selected cartridge;
    (d) said dispensing means and cartridges adapted for relative movement therebetween to allow said dispensing means to be aligned, when desired, with a selected cartridge of said plurality of cartridges; and
    (e) a memory look-up table, containing a plurality of separate, discrete dispensing programs for operation of the dispensing means and said spindle or rotary arm to dispense quantities of said items from various of said cartridges, wherein when a dispensing program is selected by a user, the dispensing program aligns the dispensing means relative to the cartridge carrier and, in particular, a selected cartridge, to:
        (i) dispense a particular quantity of an item from said selected cartridge; and (ii) in the case of a selected mix, to subsequently align with other selected cartridges to dispense, from said cartridges, a desired mix of said items.

2. An automated dispenser as claimed in claim 1, wherein the cartridge carrier is stationary and the dispensing means rotates in a circular arc relative to the said cartridge carrier to the location of a specific cartridge.

3. An automated dispenser as claimed in claim 1, wherein the dispensing means is stationary and cartridge carrier and cartridges thereon move relative to said dispensing means.

4. An automated dispenser as claimed in claim 1, wherein a funnel is positioned below the cartridge carrier, said funnel having an off-centre funnel opening beneath which a receptacle may be located in which said spice, condiment, tea, herbs, or ground coffee may be collected.

5. An automated dispenser as claimed in claim 1, wherein the cartridges consist of two (2) compartments, namely: an upper storage chamber and a lower dispensing chamber.

6. An automated dispenser as claimed in claim 5, wherein the upper storage chamber has at least one slot or cavity in the bottom of the said chamber to allow the spice and condiments to fall by gravity into the lower dispensing chamber.

7. An automated dispenser as claimed in claim 5, wherein the lower dispensing chamber is configured as a sliding member with at least one slot or cavity, which can be selectively opened by withdrawal from an associated cartridge to allow a calibrated quantity of one of said items to fall by gravity onto the funnel.

8. An automated dispenser as claimed in claim 5, wherein the dispensing means is operatively coupled to a motor which, when actuated, moveably positions the rotary arm or spindle relative to the cartridge carrier on which said cartridges are situated, to thereby align same with a selected cartridge, further having means to extend said sliding member from within said selected cartridge to thereby dispense a quantity of one of said items from said specific cartridge.

9. The automated dispenser as claimed in claim 8, wherein said cartridge carrier is circular, and said motor, when actuated, rotates the dispensing means relative to the cartridge carrier a number of angular degrees to align said dispensing means with said specific cartridge, whereafter said rotary arm or spindle which forms part of the dispensing means is adapted to move radially outwardly and cause said specific cartridge to dispense said quantity.

10. An automated dispenser as claimed in claim 9, wherein the rotary arm or spindle is fitted at the end with a dispensing hook or trigger which, when actuated, engages the lower dispensing chamber of a cartridge.

11. An automated dispenser as claimed in claim 10, wherein the dispensing means, when actuated, oscillates back and forth in a radial direction to open and close the dispensing chamber a pre-programmed number of times in order to obtain said quantity of a spice or condiment.

12. An automated dispenser as claimed in claim 4, wherein the funnel is adapted such that all surfaces thereof slope downwardly toward the direction of the funnel opening.

13. An automated dispenser as claimed in claim 4, wherein the funnel is configured such that all surfaces thereof slope down towards the direction of the funnel opening, and wherein the automated dispenser has agitation means to agitate the funnel during the dispensing sequence to facilitate the movement of the item dispensed from said selected cartridge down the funnel towards the receptacle.

14. An automated dispenser as claimed in claim 13, wherein the said agitating means comprises an electric motor coupled to said funnel adapted to cause vibration of said funnel during dispensation of said items.

15. An automated dispenser as claimed in claim 1, adapted to allow a user to select blends of said items, and having an EPROM computer chip or other electronic memory device flash memory which is programmed with a plurality of instructions for each blend of items which may be selected, which instructions direct relative movement between said dispensing means and said cartridge carrier, to allow dispensation of one of said items or a blend of said items from said automated dispenser.

16. An automated dispenser as claimed in claim 15, wherein once a spice, condiment, herb, tea, or ground coffee, or mixture thereof, is selected by a user, said automated dispensing device selects a corresponding series of instructions programmed on said EPROM computer chip or other electronic memory device, and rotates the dispensing means to a selected of said plurality of cartridges and repeats the process, if necessary, in accordance with said selected instructions, until the selected spice, condiment, herb, tea, or ground coffee, or mixture thereof, is dispensed.

17. An automated dispenser as claimed in claim 15, wherein said EPROM computer chip or other electronic memory device allows the user to scroll through spice mixes, select or set favorite blends and associated instructions, set the spice quantities to be dispensed, and dispense said spice mixes.

18. An automated dispenser as claimed in claim 1, having means to allow the user to ascertain a quantity of remaining quantity of spice, condiment, herb, tea, or ground coffee, or mixture thereof remaining in each cartridge.

19. An automated dispenser as claimed in claim 1, wherein the dispensing means is stationary and the cartridge carrier rotates in a circular arc relative to the dispensing means to align a specific cartridge with the dispensing means.

20. An automated dispenser as claimed in claim 19, wherein the cartridge carrier is coupled to a motor which, when activated, rotates the said cartridge carrier and the plurality of cartridges thereon a programmed number of degrees to align a specific cartridge with the dispensing means, whereupon said rotary arm or spindle moves radially outwardly towards the lower dispensing chamber to engage the cartridge to allow for withdrawal of said dispensing chamber from within said cartridge.

21. An automated dispenser as claimed in claim 19, wherein a funnel is positioned below the cartridge carrier and dispensing means with an off-centre funnel opening to a receptacle where the spice and condiments are collected.

22. An automated dispenser as claimed in claim 19, wherein the cartridges each comprise of two (2) compartments, namely: an upper storage chamber and slidable lower dispensing chamber.

23. An automated dispenser as claimed in claim 22, wherein the upper storage chamber has at least one slot or cavity in the bottom of the said chamber to allow an item contained in said cartridge to fall by gravity into the lower dispensing chamber.

24. An automated as claimed in claim 22, wherein the lower dispensing chamber is configured as a sliding member with at least one slot or cavity, which sliding member can be repetitively opened and closed to allow a calibrated quantity of spice to fall by gravity onto a funnel positioned below the cartridge carrier and dispensing means with an off-centre funnel opening to a receptacle where the spice and condiments are collected.

25. An automated dispenser as claimed in claim 19, wherein the cartridge carrier is coupled to a motor which, when actuated, rotates said carrier a programmed number of degrees to align with the dispensing means, whereupon a rotary arm or spindle thereafter moves radially out towards the dispensing chamber of a selected cartridge, and withdraws the sliding member from the selected cartridge.

26. An automated dispenser as claimed in claim 25, wherein the dispensing means is fitted at the end with a dispensing hook or trigger which, when actuated, engages the lower dispensing chamber of said selected cartridge.

27. An automated dispenser as claimed in claim 26, wherein the dispensing means, when actuated, oscillates back and forth in a radial direction to open and close the lower dispensing chamber a pre-programmed number of times in order to obtain a specified quantity of a spice or condiment.

28. An automated dispenser as claimed in claim 21, wherein the funnel is designed such that all surfaces slope downwardly towards a direction of the funnel opening.

29. An automated dispenser as claimed in claims 28, wherein the funnel agitates during the dispensing sequence to facilitate the movement of the spice and condiment down the funnel towards the receptacle.

30. An automated dispenser as claimed in claim 25, wherein the said agitating means is normally inactive and includes an electric motor coupled to said funnel and adapted to vibrate same when activated during the dispensing sequence.

31. An automated dispenser as claimed in claim 19, further having an eprom chip or flash memory or similar memory device, further having a plurality of dispensing programs, further having means to allow a user to select one of a number of spice mixes and an associated dispensing program.

32. An automated dispenser as claimed in claim 31, wherein once a selected dispensing program is initiated, the program automatically rotates the cartridge carrier to the dispensing means to dispense a particular spice, and then repeats the process with other selected cartridges until the specified spice mix is dispensed.

33. An automated dispenser as claimed in claim 31, programmed to allow the user to scroll through spice mixes, select or set favorite blends, set the spice quantities to be dispensed, and activate the dispensing of a selected quantity of an individual spice, a spice blend, a favorite spice mix, or to save a mix in the program.

34. An automated dispenser as claimed in claim 33, programmed to allow the user to verify the remaining quantity of spice in each cartridge.

35. An automated spice, herb, condiment, tea, and/or ground coffee dispenser, comprising:
 (a) a plurality of cartridges, adapted to be individually filled, respectively, with one of the items selected from the group of items comprising spices, herbs, teas, condiments, and ground coffee beans;
 (b) a cartridge carrier adapted to hold said plurality of cartridges in a radially spaced and contiguously arranged circumferential manner around said vertical axis of said cartridge carrier;
 (c) a dispensing means, comprised of a least one spindle or rotary arm extending radially outwardly from said vertical axis, which when activated, engages with a slider member to trigger dispersal by gravity of a calibrated amount of spice, herb, condiment, or powdered beverage, from a selected cartridge;
 (d) said dispensing means adapted for circular movement relative to said cartridge carrier about said vertical axis.

36. An automated dispenser as claimed in claim 35, further having cartridges which bear unique identification, and further having cartridge recognition system to identify each of said plurality of cartridges using unique identification thereon.

37. A cartridge adapted for use in any of the automated dispensers as claimed in any one of claim 1 or 36.

38. A method for dispensing spice, herbs, condiments, and/or powdered beverages via an automated dispenser, wherein said automated dispenser comprises:
 (a) a plurality of cartridges, adapted to be individually filled, respectively, with a variety of spices, herbs, condiments, and/or powdered beverages;
 (b) a cartridge carrier, having a vertical axis, designed to hold said plurality of cartridges in a radially spaced and contiguously arranged circumferential manner around said carrier and vertical axis thereof;
 (c) a dispensing means, comprised of a least one spindle or rotary arm extending radially outwardly from said vertical axis, which when activated, engages with a slider member to trigger dispersal by gravity of a calibrated amount of spice, herb, condiment, or powdered beverage, from a selected cartridge;
 (d) said dispensing means adapted for circular movement relative to said cartridge carrier about said vertical axis; and
 (e) a memory look-up table, containing a plurality of separate, discrete dispensing programs for directing relative motion of the dispensing means relative to said cartridge carrier to dispense a particular variety of mixtures and quantities from said cartridges,
wherein when a dispensing program is selected by a user, the dispensing program aligns the dispensing means relative to the cartridge carrier and, in particular, a selected cartridge to:
 (i) dispense a particular quantity of spice or condiment;
 (ii) and, in the case of a mix, to subsequently align with other selected cartridges to provide, from said cartridges, a desired mix of spice, herbs, condiments, and/or granulated beverage;
said method comprising the steps of:
 (i) a user selecting a dispensing program;
 (ii) said dispensing program thereafter aligning one or more of said cartridges with said dispensing means to dispense quantities of said spice, condiment, herbs, or granulated beverage, from one or more of said cartridges.

\* \* \* \* \*